United States Patent [19]

Jackson

[11] Patent Number: 5,811,691
[45] Date of Patent: Sep. 22, 1998

[54] BLADE-MOUNTED TOTAL PRESSURE PROBE FOR A ROTATING BLADE

[75] Inventor: Michael E. Jackson, Shelton, Conn.

[73] Assignee: Sikorsky Aircraft Corporation, Stratford, Conn.

[21] Appl. No.: 998,530

[22] Filed: Dec. 26, 1997

[51] Int. Cl.$^6$ ..................................................... G01F 1/46
[52] U.S. Cl. ............................................................ 73/861.65
[58] Field of Search .................................. 364/558, 565, 364/571.02, 571.03; 73/178 H, 180, 182, 861.65, 861.66, 861.67, 861.68

[56] References Cited

U.S. PATENT DOCUMENTS

| | | | |
|---|---|---|---|
| 3,585,859 | 6/1971 | DeLeo et al. | 73/388 |
| 3,673,866 | 7/1972 | Alperovich et al. | 73/212 |
| 3,739,638 | 6/1973 | White et al. | 73/181 |
| 3,781,895 | 12/1973 | Monser | 343/708 |
| 4,184,149 | 1/1980 | Baker et al. | 340/177 VA |
| 4,645,517 | 2/1987 | Hagen et al. | 55/182 |
| 4,648,269 | 3/1987 | Durand | 73/178 H |
| 4,672,846 | 6/1987 | LeBlond et al. | 73/180 |
| 4,718,273 | 1/1988 | McCormack | 73/180 |
| 4,836,019 | 6/1989 | Hagen et al. | 73/180 |
| 4,981,038 | 1/1991 | Torres et al. | 73/182 |
| 5,025,661 | 6/1991 | McCormack | 73/180 |
| 5,083,279 | 1/1992 | Burdoin | 364/435 |
| 5,099,686 | 3/1992 | Kohler | 73/182 |
| 5,117,687 | 6/1992 | Gerardi | 73/170 R |
| 5,257,536 | 11/1993 | Beigbeder et al. | 73/180 |
| 5,319,970 | 6/1994 | Peterson et al. | 73/182 |
| 5,337,602 | 8/1994 | Gibson | 73/182 |
| 5,442,958 | 8/1995 | Hagen | 73/170.02 |
| 5,544,526 | 8/1996 | Baltins et al. | 73/180 |
| 5,610,845 | 3/1997 | Slabinski et al. | 364/565 |

OTHER PUBLICATIONS

Van Nostrand's Scientific Encyclopedia, 7th Ed., vol. 1, "Airspeed Indicator" (pp. 77–78 (Van Nostrand Reinhold 1989) (no month).

Van Nostrand's Scientific Encyclopedia, 7th Ed., vol. 2, "Pitot Tube" (p. 2228) (Van Nostrand Reinhold 1989) (no month).

Primary Examiner—William L. Oen
Attorney, Agent, or Firm—Terrance J. Radke

[57] ABSTRACT

A blade-mounted total pressure (BMTP) probe for a rotor blade comprises a base segment and an inlet segment. The base segment includes an interface surface having a planar configuration that is complementary to an aerodynamic surface of the rotor blade for detachably mounting the BMTP probe in combination with the rotor blade, an aerodynamically-streamlined body member contiguous with the interface surface that includes a leading edge and first and second flow surfaces, and a fluid communication aperture extending through the aerodynamically-streamlined body member and the interface surface. The inlet segment comprises an inlet defined by a lower wall contiguous with the aerodynamically-streamlined member, opposed sidewalls contiguous with the lower wall, and an upper wall contiguous with the opposed sidewalls. The inlet segment further includes a backwall contiguous with the lower wall, the opposed sidewalls, and the upper wall and wherein the backwall, the lower wall, the opposed sidewalls, and the said upper wall in combination define a collection chamber within the inlet segment. A fluid communication aperture extends through the lower wall in aligned relation with the fluid communication aperture of the base segment. An ejection port is formed through the one opposed sidewall distal from the center of rotation of the main rotor blade.

12 Claims, 2 Drawing Sheets

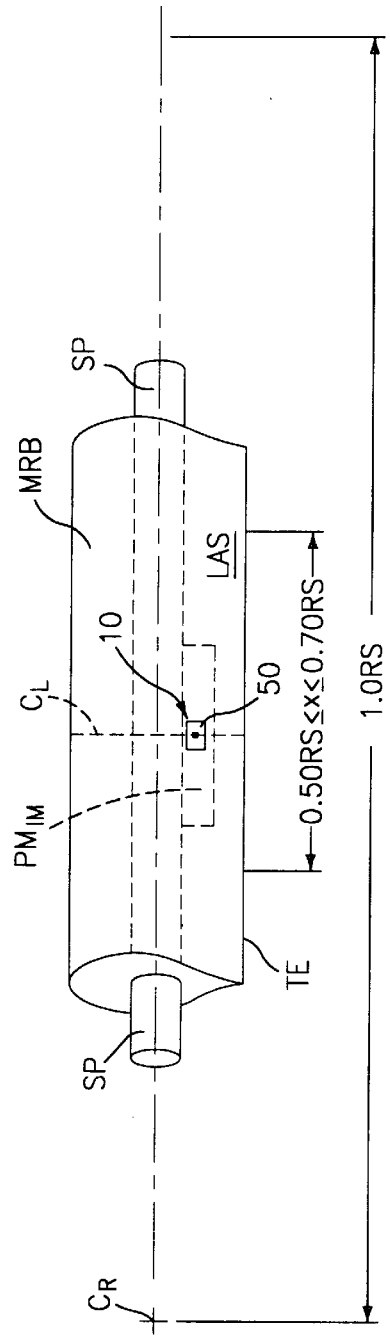
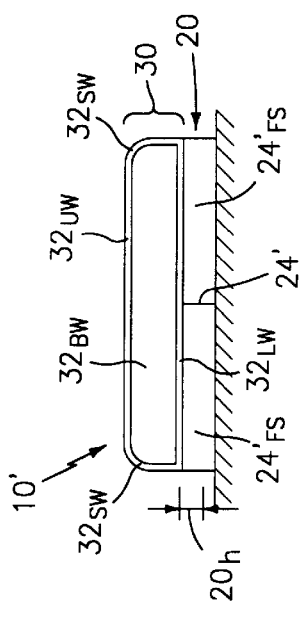
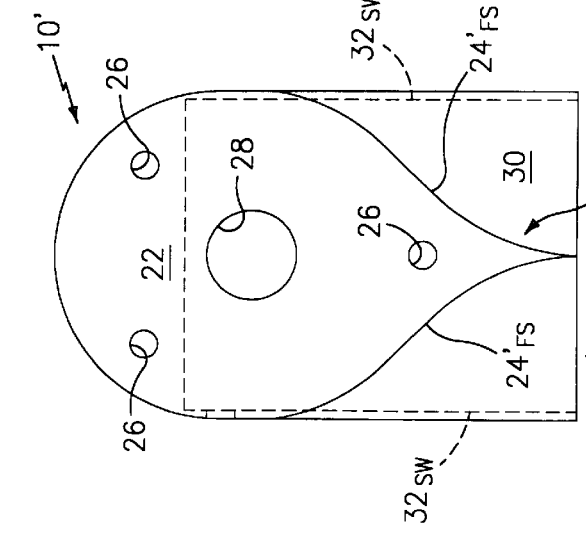
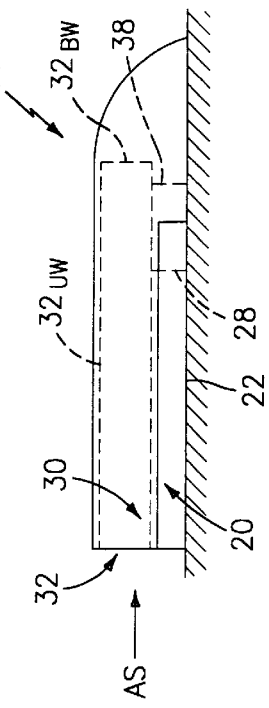

BLADE-MOUNTED TOTAL PRESSURE PROBE FOR A ROTATING BLADE

TECHNICAL FIELD

The present invention is directed to air-data instrumentation, and more particularly, to a blade-mounted total pressure (BMTP) probe for a rotating blade to detect the total pressure of the local airstream flowing across such rotating blade. The BMTP probe of the present invention has particular utility in combination with a main rotor blade of a helicopter for determining the airspeed of the helicopter.

BACKGROUND ART

Air-data instrumentation is universally used in the aerospace field to determine various parameters such as indicated airspeed, true airspeed, and altitude that are necessary for safe and efficient aircraft flight operations. For aerospace applications, a pitot-static tube or probe is one of the most commonly used air-data instruments for the determination of flight parameters that are based upon pressure readings of the local airstream in which an aircraft is operating. A pitot-static tube is typically configured to detect the pitot or total pressure and the static pressure of the local airstream in which the aircraft is operating. The pressure differential between the total and static pressures is a measure of the indicated airspeed of the aircraft, which can be readily determined using known computational techniques; correlating such pressure differential with the free stream temperature and static pressure provides a measure of the true airspeed of the aircraft, which can also be readily determined using known computational techniques.

Representative examples of prior art pitot-static probe configurations are illustrated in U.S. Pat. Nos. 5,544,526, 5,442,958, 5,337,602, 5,319,970, 5,099,686, 5,083,279, 5,025,661, 4,981,038, 4,836,109, 4,718,273, 4,672,846, 4,645,517, 4,184,149, 3,781,895, 3,739,638, 3,673,866, and 3,585,859. Such prior art pitot-static probes are typically fabricated as dedicated components that are hard-mounted in combination with the aircraft, e.g., fuselage, wing, to protrude into the local airstream for detection of the total and static pressures thereof; although it is known in the art to use deployable pitot-static probes, see, e.g., U.S. Pat. No. 5,442,958, or to configure aircraft structures to perform the pressure differential detecting function, see, e.g., U.S. Pat. No. 5,083,279 wherein it is taught that the canard of an aircraft can be modified to include pressure-detection ports.

The typical prior art pitot-static probe has an aerodynamically streamlined configuration to maximize pressure recovery (as used herein, the terminology pressure recovery is a measure of the accuracy of the total pressure and static pressure detected by the pitot-static probe) in the local airstream inasmuch as any disruptions in the flow of the local airstream due to the pitot-static probe configuration will induce error into the total and static pressures detected by the probe. For the same reason, pitot-static probes must be sufficiently displaced from the aircraft to ensure that the flow of the local airstream over the aircraft itself does not contaminate the total and static pressures detected by the probe.

The typical prior art pitot-static probe configuration includes a forward single total pressure port that is orientated with the flight axis, i.e., longitudinal axis, of the aircraft so that such forward port is orientated substantially perpendicular to the local airstream to maximize pressure recovery with respect to the local airstream total pressure, see, e.g., U.S. Pat. No. 4,184,149. Pressure recovery with respect to the local airstream total pressure may be adversely impacted by angle of attack and/or side slip flight operations that cause the flight axis of the aircraft to be skewed with respect to the local airstream. The prior art also teaches that the pitot-static probe may be fabricated so that the forward total pressure port has an asymmetrical configuration to compensate for such angle of attack flight orientations and/or to include forward, paired off-axis ports to compensate for angle of attack and/or side slip flight operations, see, e.g., U.S. Pat. No. 4,718,273.

The prior pitot-static probe configuration also includes one or more downstream static pressure ports that are substantially parallel to the local airstream to detect the static pressure of the local airstream. Multiple, paired static pressure ports are often used to maximize pressure recovery with respect to the static pressure of the local airstream when the aircraft is subjected to angle of attack and/or side slip flight orientations, see, e.g., U.S. Pat. No. 5,025,661.

While such prior art pitot-static probes are generally effective in maximizing pressure recovery with respect to total and static pressure for winged-type aircraft, special considerations arise when such pitot-static probes are utilized for helicopter applications. As one skilled in the art would appreciate, the operation of the rotor assembly of a helicopter causes significant disruptions in the flow of the local airstream over and/or adjacent the helicopter fuselage, e.g., rotor downwash, that can adversely impact pressure recovery with respect to total and/or static pressure of the local airstream. Therefore, the effects of rotor downwash must be considered when hard mounting a conventional pitot-static probe to a helicopter fuselage. In addition, a conventional pitot-static probe that is hard mounted to the helicopter fuselage is not optimally suited for the unique flight capabilities offered by a helicopter, e.g., the capability to hover, the capability to conduct low speed forward flight operations, and/or the ability to conduct sideways or rearward flight operations. That is, the pressure ports of such a hard-mounted pitot-static probe are not properly orientated for such helicopter flight operations, and, as a result, provide poor pressure recovery under such flight conditions. Finally, there is a tendency for a pitot-static tube hard mounted to the helicopter fuselage to provide airspeed indications based upon the speed of rotation of the rotor, rather than the airspeed of the helicopter.

For maximum effectiveness in helicopter applications, a pitot-static type probe should be hard mounted in combination with the helicopter rotor assembly, e.g., in combination with the main rotor blades thereof. Hard mounting of a pitot-static probe in combination with a main rotor blade is functionally similar in effect to the mounting of a pitot-static probe in combination with the wing of an aircraft, i.e., such mounting provides an optimal location for detecting the total and/or static pressures of the local airstream (which for helicopter applications is primarily due to the rotation of the main rotor blades). In addition, rotor blade mounting pragmatically eliminates the effects of rotor downwash since this phenomenon is a result of vortices that are shed downwardly from the trailing edge of each rotating rotor blade. Moreover, a blade-mounted pitot-static probe would be capable of providing airspeed indications during all of the various flight regimes of which a helicopter is capable.

Heretofore, however, the use of pitot-static probes in combination with a rotating blade have not been particularly effective for detecting the total and static pressure of the airstream flowing across a rotating blade. Such pitot-static probes have embodied the conventional configuration of the pitot-static tubes designed for use in conjunction with an aircraft wing, see, e.g., U.S. Pat. No. 3,585,859, but such configuration has been miniaturized for such a helicopter application. Such miniaturized pitot-static probes, however, are not well suited for the typical environments in which helicopters conduct flight operations. For example, miniaturized pitot-static probes are extremely susceptible to clogging by particulate matter such as insects and sand during near-earth helicopter flight operations. Moreover, the configuration of such miniaturized pitot-static probes is not robust enough to withstand the erosion effects experienced during near-earth helicopter flight operations, and such a configuration is susceptible to damage during routine maintenance operations. Further, the configuration of such miniaturized pitot-static probes is prone to malfunctioning during operation in heavy rains.

A need exists to provide a pitot probe for a rotating blade that is specifically designed for use in combination with a rotating blade. Such a pitot probe should have a robust configuration that is damage tolerant and that will withstand the erosion effects induced by particulate matter during near-earth helicopter flight operations. Such a pitot probe should be configured with a minimal structural envelope to minimize adverse aerodynamic effects during rotation of the rotor blade. The pitot probe should have a configuration that provides optimal pressure recovery over the in-flight angle of attack range of the rotor blade. Such a pitot probe should be configured to provide a means for readily expelling particulate matter and moisture during helicopter flight operations without adversely affecting the pressure recovery capability of the probe. Such a pitot probe should have a configuration that facilitates the transfer of thermal energy into and through the probe to satisfy de-icing requirements.

DISCLOSURE OF THE INVENTION

One object of the present invention is to provide a blade-mounted total pressure (BMTP) probe that has a configuration that facilitates mounting of the probe in combination with one of the aerodynamic surfaces, preferably the lower aerodynamic surface, of a rotor blade.

Another object of the present invention is to provide a BMTP probe that has a configuration that provides optimal pressure recovery over the in-flight angle of attack range of the rotor blade.

A further object of the present invention is to provide a BMTP probe that has a robust configuration that is damage tolerant and that will withstand the erosion effects induced by particulate matter during near-earth flight operations.

One more object of the present invention is to provide a BMTP probe that is configured with a minimal structural envelope to minimize adverse aerodynamic effects during rotation of the rotor blade.

Yet another object of the present invention is to provide a BMTP probe that has a configuration that facilitates the transfer of thermal energy from the rotor blade into and through the probe.

These and other objects of the present invention are achieved by means of a BMTP probe that comprises a base segment and an inlet segment. The base segment includes an interface surface having a planar configuration that is complementary to an aerodynamic surface of the rotor blade for detachably mounting said BMTP probe in combination with a rotor blade, an aerodynamically-streamlined body member contiguous with said interface surface that includes a leading edge and first and second flow surfaces, and a fluid communication aperture extending through the aerodynamically-streamlined body member and the interface surface.

The inlet segment comprises an inlet defined by a lower wall contiguous with the aerodynamically-streamlined body member, opposed sidewalls contiguous with the lower wall, and an upper wall contiguous with the opposed sidewalls. The inlet segment further includes a backwall contiguous with the lower wall, the opposed sidewalls, and the upper wall and wherein the backwall, the lower wall, the opposed sidewalls, and the upper wall in combination define a collection chamber within the inlet segment. A fluid communication aperture extends through the lower wall in aligned relation with the fluid communication aperture of the base segment. An ejection port is formed through the opposed sidewall distal from the center of rotation of the main rotor blade.

BRIEF DESCRIPTION OF THE DRAWINGS

A more complete understanding of the present invention and the attendant features and advantages thereof may be had by reference to the following detailed description when considered in conjunction with the following drawings wherein:

FIG. 2 is a partial plan view of the lower aerodynamic surface of a main rotor blade illustrating a mounting site for the BMTP probe according to the present invention.

FIGS. 3A, 3B, 3C are bottom, front, and side plan views, respectively, of another embodiment of a BMTP probe according to the present invention.

BEST MODE FOR CARRYING OUT THE INVENTION

Figure 1A:
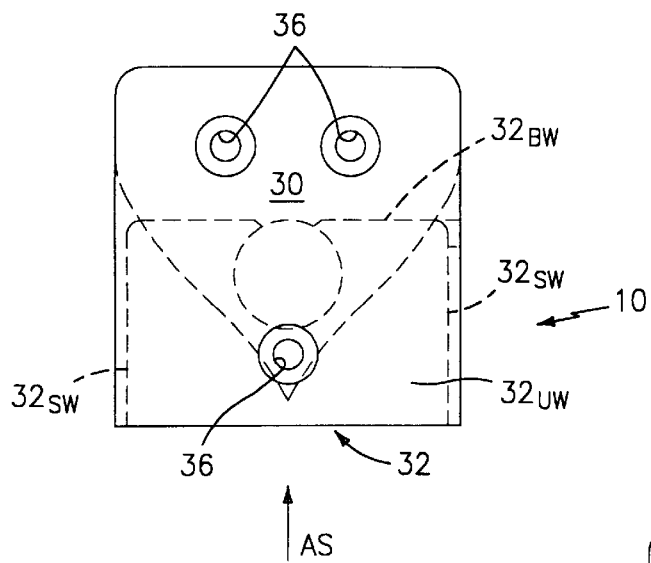
FIG. 1A is a top plan view of one preferred embodiment of a blade-mounted total pressure (BMTP) probe according to the present invention.
Figure 1B:
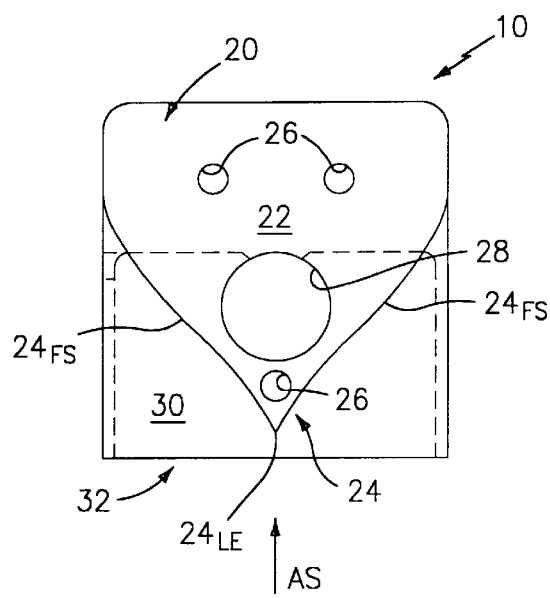
FIG. 1B is a bottom plan view of the BMTP probe of FIG. 1A.

Referring now to the drawings wherein like reference numerals identify corresponding or similar elements throughout the several views, FIGS. 1A–1F illustrate one preferred embodiment of a blade-mounted total pressure (BMTP) probe 10 according to the present invention. The BMTP probe 10 is configured for detachable mounting in combination with the aerodynamic surface of one of the main rotor blades of a helicopter shipset (see FIG. 2). The structural envelope of the BMTP probe 10 is minimized for low observability and for reduction of adverse aerodynamic effects, e.g., drag, flow disruption, while concomitantly providing uniform recovery with respect to detected total pressure over the in-flight angle of attack range of the main rotor blade. The structural configuration of the BMTP probe 10 is robust, i.e., relatively insensitive to external environmental influences (as opposed to a conventional miniaturized pitot-static probe), is not readily damaged during routine maintenance procedures, and is easily maintained. The configuration of the BMTP probe 10 facilitates the expulsion of water and particulate matter therefrom during rotation of the main rotor blade, and, in addition, readily accommodates de-icing requirements dictated by flight safety constraints. The configuration of the BMTP probe 10 readily facilitates the manufacture thereof, and the mounting/de-mounting thereof in detachable combination with the main rotor blade.

The BMTP probe 10 according to the present invention is functionally configured to detect the total pressure of the local airstream AS flowing across the main rotor blade. The BMTP probe 10 according to the present invention is designed to take advantage of the recent advances in air data processing technology as exemplarily represented by the apparatus and method described in U.S. Pat. No. 5,610,845. The '845 patent teaches that the total pressure of the airstream AS flowing over a rotating member such as a helicopter main rotor blade can be subjected to harmonic analysis techniques to derive the steady state, first harmonic, and second harmonic components of the detected total pressure, and that the helicopter velocity (and/or the static pressure and/or temperature of such airstream) can be readily computed from such analysis components.

The BMTP probe 10 illustrated in FIGS. 1A–1F is fabricated as a unitary component that comprises a base segment 20 and an inlet segment 30. Alternatively, the base segment 20 and the inlet segment 30 may be fabricated as individual components that are ultimately integrated in combination when the BMTP probe 10 is detachably mounted in combination with the main rotor blade. The BMTP probe 10 can be fabricated from any of the various materials that are commonly used for aerospace applications, provided that any such material meets the following functional constraints. First, the selected material should be capable of being heated without adverse effect on the structural integrity of the BMTP probe 10 so that the BMTP probe 10 can be thermally de-iced during rotation of the main rotor blade. Concomitantly, the material selected for the BMTP probe 10 should possess good heat transfer characteristics so that de-icing heat is thermally coupled from the base segment 20 to the inlet segment 30. Finally, the selected material of the BMTP probe 10 should be abrasion resistant with respect to the impact velocities of particulate matter and/or moisture typically encountered by helicopter main rotor blades during flight operations.

The base segment 20 is configured to perform three functions: (1) detachable mounting of the BMTP probe 10 in combination with the aerodynamic surface of one of the main rotor blades of a helicopter shipset; (2) coupling of the total pressure of the local airstream AS detected by the blade-mounted BMTP probe 10 to a processing means internally mounted within such main rotor blade; and (3) coupling of de-icing thermal energy generated by the internally-mounted processing means to the inlet segment 30. The base segment 20 includes an interface surface 22, an aerodynamically-streamlined body member 24, mounting bores 26, and a fluid communication aperture 28. The interface surface 22 has a planar configuration that is complementary to the aerodynamic surface of the main rotor blade at the mounting site for flush mounting of the BMTP probe 10 in combination with the main rotor blade.

For the described embodiment of the BMTP probe 10, and preferably for any variations of the present invention, the BMTP probe 10 is configured for mounting to the lower aerodynamic surface of the main rotor blade as described in further detail hereinbelow. Mounting in combination with the lower aerodynamic surface is more advantageous than mounting in combination with the upper aerodynamic surface inasmuch as the flow over the upper aerodynamic surface is more prone to flow separation as the main rotor blade is positioned at higher angles of attack. Such flow separation would induce anomalies in the total pressure detected by the BMTP probe 10, and, concomitantly, would cause erroneous airspeed (and/or airstream static pressure and/or temperature) indications. Further, mounting of the BMTP probe 10 in combination with the upper aerodynamic surface of the main rotor blade can cause a performance decrement of the main rotor blade due to disruptions of the airstream flowing over the main rotor blade, e.g., a decrease in the aerodynamic lift generated by the main rotor blade, and/or an increase in the aerodynamic drag due to the rotation of the main rotor blade.

In addition, the interface surface 22 is operative to couple thermal energy into the base segment 20 for coupling into the inlet segment 30 for de-icing of the BMTP probe 10 during rotation, of the main rotor blade. The thermal energy is generated during operation of the internally-mounted processing means described in further detail hereinbelow. Thus, the BMTP probe 10 according to the present invention eliminates the need for separate internal circuitry to satisfy probe de-icing requirements.

The aerodynamically-streamlined body member 24, which is operative to direct the flow of the local airstream AS (more specifically, the boundary layer portion of the local airstream AS flow as discussed in further detail hereinbelow) around the BMTP probe 10 with minimal flow disruptions, is defined by a leading edge $24_{LE}$ and first and second flow surfaces $24_{FS}$ contiguous with and extending downstream from the leading edge $24_{LE}$. Preferably the flow surfaces $24_{FS}$ are mirror images of one another with respect to the leading edge $24_{LE}$, i.e., symmetrical, to minimize disruption of the local airstream AS flowing past the BMTP probe 10 (a disruption in the local airstream AS flow may contaminate the total pressure detected by the BMTP probe 10) and/or to minimize the induced drag generated by the BMTP probe 10.

The mounting bores 26 are sized to accommodate mounting bolts/screws (not shown) for detachably mounting the BMTP probe 10 in combination with the main rotor blade. The fluid communication aperture 28 couples the local airstream AS flow detected by the inlet segment 30 of the BMTP probe 10 to an internally-mounted processing means disposed in the main rotor blade. The internally-mounted processing means may be an apparatus of the type described in U.S. Pat. No. 5,610,845 that is operative to locally process the detected total pressure and transmit signals representative of the helicopter airspeed (and/or the static pressure and/or temperature of the local airstream AS) to the helicopter flight computer. For an internally-mounted processing means of this ilk, a separate means for detecting the static pressure of the local airstream AS is not required.

Alternatively, the internally-mounted processing means could be a conventional pressure transducer that converts the detected total pressure to an electrical signal having a magnitude representative of the detected total pressure that is coupled to an on-board computer system, e.g., the flight computer, for further signal processing. For this type of internally-mounted processing means, a separate means for detecting the static pressure of the local airstream AS is required. Signals representative of the total pressure (as detected by the BMTP probe 10 according to the present invention) and the static pressure would be transmitted to an on-board computer system for processing to determine selected flight parameters, e.g., indicated airspeed, using known computational techniques.

As is well know to those skilled in the art, the local airstream AS flowing over an airfoil such as a rotating main rotor blade is subject to viscosity effects that result in boundary layers (either laminar or turbulent) being formed adjacent the upper and lower aerodynamic surfaces of the airfoil. The pressure within such boundary layers is not an accurate reflection of the total pressure of the local airstream AS flowing over the airfoil. Therefore, the base segment 20 of the BMTP probe 10 is configured to provide a predetermined offset $20_h$ (see FIG. 1C) so that the inlet segment 30 of the BMTP probe 10 is positioned in the local airstream AS proper, and not within the boundary layer associated with the local airstream AS flowing over the upper or lower aerodynamic surfaces of the main rotor blade. This ensures that the total pressure detected by the inlet segment 30 of the BMTP probe 10 is based upon the local airstream AS flowing over the rotating main rotor blade.

For the purposes of the present invention, the predetermined offset $20h$ provided by the base segment 20 is empirically based upon the length of the chord of the main rotor blade at the mounting site of the BMTP probe 10, and, for the described embodiment, the predetermined offset $20h$ is approximately six percent (6%) of such chord length. Alternatively, one skilled in the art could use established computational techniques, based upon known fluid dynamic principles and equations, to determine the predetermined offset $20h$ required for the base segment 20 of the BMTP probe 10.

Figure 1C:
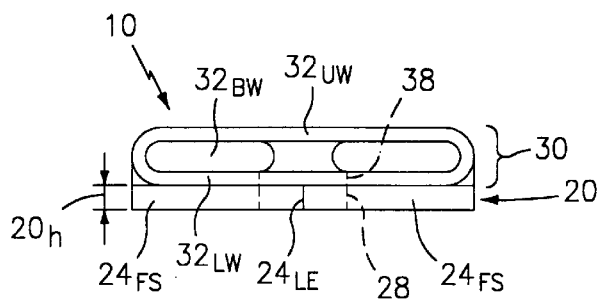
FIG. 1C is a front plan view of the BMTP probe of FIG. 1A illustrating the inlet configuration thereof.
Figure 1D:
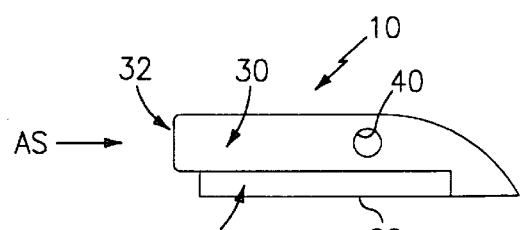
FIG. 1D is one side plan view of the BMTP probe of FIG. 1A.
Figure 1E:
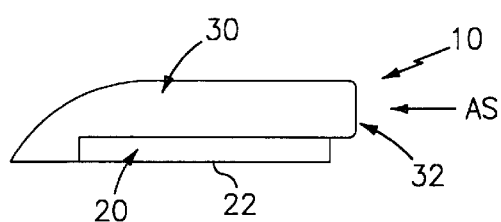
FIG. 1E is an opposite side plan view of the BMTP probe of FIG. 1A.

The inlet segment 30 is configured to perform two functions: (1) to effectively detect, over the angle of attack range of the main rotor blade, the total pressure of the local airstream AS flowing over the aerodynamic surface of the main rotor blade, i.e., full pressure recovery; and (2) to couple the detected total pressure to the fluid communication aperture 28 of the base segment 20. The inlet segment 30 comprises an inlet 32 defined by an upper wall $32_{UW}$, opposed sidewalls $32_{SW}$, and a lower wall $32_{SW}$, a collection chamber 34 defined by the upper wall $32_{UW}$, the opposed sidewalls $32_{SW}$, the lower wall $32_{SW}$, and a backwall $32_{BW}$, chamfered mounting bores 36, a fluid communication aperture 38, and an expulsion port 40. As shown in FIG. 1C, the inlet 32 has an asymmetrical configuration that is elongated along a first axis (corresponding to the radial axis of the main rotor blade), but is symmetrical with respect to the leading edge $24_{LE}$ of the aerodynamically-streamlined body member 24, and relatively narrow along a second axis (corresponding to the perpendicular with respect to the aerodynamic surface of main rotor blade). Such an asymmetrical inlet configuration maximizes the pressure recovery provided by the BMTP probe 10 according to the present invention over the angle of attack range of the main rotor blade inasmuch as increasing the area of the inlet opening decreases the sensitivity of the BMTP probe 10 to angle of attack effects. For the described embodiment of the BMTP probe 10, which is configured for mounting on the lower aerodynamic surface of the main rotor blade of the RAH-66 Comanche helicopter being developed by the Sikorsky Aircraft Corporation, the main rotor blades may be pitched through an angle of attack range of −10° to +20°. The embodiment of the BMTP probe 10 described herein provides a pressure recovery of approximately ninety-eight percent (98%) within the range of −50 to +100 of the described angle of attack range of the main rotor blade.

The chamfered mounting bores 36 are contiguous and aligned with the mounting bores 26. The mounting bores 36 are chamfered so that when mounting bolts/screws (not shown) are inserted through the mounting bores 36, 26 to detachably mount the BMTP probe 10 in combination with the main rotor blade, the heads of such mounting bolts/screws are flush with the exterior surface of the upper wall $32_{UW}$ wherein such mounting bolts/screws do not disrupt the local airstream AS flowing over the BMTP probe 10.

The fluid communication aperture 38 is formed through the lower wall $32_{LW}$ defining the inlet segment 30 and is contiguous and aligned with the fluid communication aperture 28 of the base segment 20 so that the total pressure in the collection chamber 34 is communicated, via the base segment 20, to the processing means internally mounted within the main rotor blade.

The expulsion port 40 is operative to expel ingested particulate matter and/or moisture from the collection chamber 34 during rotation of the main rotor blade. Expulsion of particulate matter and/or moisture is effected by means of the centrifugal force generated by the rotation of the main rotor blade. The expulsion port 40 is formed through the radially outward sidewall $32_{SE}$ of the inlet segment 30, that is, the sidewall $32_{SE}$ that is radially distal from the center of rotation of the main rotor blade. The expulsion port 40 is dimensioned to ensure that particulate matter (including ice particles) and moisture will be expelled by means of the expulsion port 40, i.e., the expulsion port 40 does not become blocked. The size of the expulsion port 40 is a design constraint compromise based upon the maximum size of particulate matter to be ejected versus the loss of pressure recovery due to the expulsion port 40. However, in light of the large area of the inlet 32, the expulsion port 40 of the BMTP probe 10 can be sized to accommodate the expulsion of almost all expected particulate matter.

The embodiment of the BMTP probe 10 described hereinabove has the following configuration: an overall width dimension (in the radial direction) of approximately 3.861 centimeters (1.520 inches); an overall length dimension (in the chordal direction) of approximately 3.863 centimeters (1.521 inches); an overall height dimension (perpendicular to the blade aerodynamic surface) of approximately 2.032 centimeters (0.8000 inches); circular fluid communication apertures 28, 38 having a diameter of approximately 1.181 centimeters (0.4650 inches), and an expulsion port 40 diameter of approximately 0.3175 centimeters (0.125 inches). The upper wall $32_{UW}$, the sidewalls $32_{SW}$, and the lower wall $32_{LW}$ each have a thickness of approximately 0.1524 centimeters (0.06 inches), and the predetermined offset $20h$ for the described embodiment is approximately 0.254 centimeters (0.10 inches)—based upon a main rotor blade for the RAH-66 Comanche helicopter having a chord length of approximately 43.2 centimeters (17.0 inches). The inlet 32 has a frontal area slightly greater than 1.174 square centimeters (0.182 square inches), and the collection chamber 34 has a volume slightly greater than 2.631 cubic centimeters (0.161 cubic inches).

Referring to FIG. 2, a mounting site 50 for detachably mounting the BMTP probe 10 according to the present invention in combination with the lower aerodynamic surface LAS of a helicopter main rotor blade MRB is exemplarily illustrated. The mounting site 50 is defined in terms of a radial station RS wherein the radial station terminology defines a radial distance to a local chord line $C_L$ of the main rotor blade MRB with respect to the center of revolution $C_R$ of the main rotor assembly, i.e., axis of rotation for the main rotor blade MRB (for example, a radial station RS value of 1.0 defines the tip of the main rotor blade). Although the BMTP probe 10 according to the present invention can be mounted at any radial station RS of the main rotor blade, it is preferable to locate the mounting site 50 within the range of the 0.50 RS≦mounting site 50≦0.70 RS. Defining the mounting site 50 at a location greater than 0.70 RS subjects the BMTP probe 10 to increased abrasion erosion due to the fact that the rotational velocity of a main rotor blade increases with increasing radial station. Conversely, defining a mounting site at a location less than 0.50 RS results in a rotational velocity of the main rotor blade that may not accurately reflect the local airstream AS flowing across the main rotor blade. In addition, the closer to the center of rotation $C_R$ of the main rotor blade, there is a greater likelihood that rotor downwash interference effects with the helicopter fuselage may adversely affect the local airstream AS flowing over the main rotor blade.

Once the mounting site 50 is defined in terms of the radial station RS, the mounting site 50 is further defined in terms of the local chord length $C_L$. It is preferable to detachably mount the BMTP probe 10 in superposed combination with the internally-mounted processing means $PM_{IM}$ disposed in the main rotor blade MRB. Such a mounting scheme effectively minimizes any lags associated with converting the total pressure detected by the BMTP probe 10 into an electrical signal representative of the detected total pressure by the internally-mounted processing means $PM_{IM}$. Since the main rotor blade MRB includes an internal spar SP as the primary structural element of the main rotor blade MRB, this perforce limits the options for internally mounting the processing means. Preferably, the processing means $PM_{IM}$ is internally mounted within the main rotor blade MRB immediately adjacent to the spar SP in the aft direction, i.e., towards the trailing edge TE of the main rotor blade. The BMTP probe 10 is detachably mounted in combination With the main rotor blade MRB so that a line extending through the leading edge $24_{LE}$ of the base segment 20 is substantially aligned with the local chord $C_L$.

FIGS. 3A–3C illustrate yet another embodiment of a BMTP probe 10' according to the present invention. This embodiment of the BMTP probe 10' has the same structural features as the BMTP probe 10 described in detail hereinabove, except that the aerodynamically-streamlined body member 24' of the BMTP probe 10' illustrates another aerodynamic configuration.

A variety of modifications and variations of the present invention are possible in light of the above teachings. For example, the embodiments of the BMTP probe 10, 10' described hereinabove included aligned mounting bores for detachably mounting the BMTP probe 10 or 10' in combination with the main rotor blade. One skilled in the art will appreciate that the mounting bores could be eliminated and other conventional means such as an adhesive can be used to detachably mount the probe 10 or 10' in combination with the main rotor blade. It is therefore to be understood that, within the scope of the appended claims, the present invention may be practiced otherwise than as specifically described hereinabove.

What is claimed is:

1. A blade-mounted total pressure probe for a rotor blade, comprising:

a base segment including
an interface surface having a planar configuration that is complementary to an aerodynamic surface of the rotor blade for detachably mounting said blade-mounted total pressure probe in combination with the rotor blade,
an aerodynamically-streamlined body member contiguous with said interface surface and including a leading edge and first and second flow surfaces, and
a fluid communication aperture extending through said aerodynamically-streamlined body member and said interface surface; and an inlet segment including
a lower wall contiguous with said aerodynamically-streamlined body member, opposed sidewalls contiguous with said lower wall, and an upper wall contiguous with said opposed sidewalls, and wherein said lower wall, said opposed sidewalls, and said upper wall in combination define an inlet,
a backwall contiguous with said lower wall, said upper wall, and said opposed sidewalls, and wherein said backwall, said lower wall, said opposed sidewalls, and said upper wall in combination define a collection chamber,
a fluid communication aperture extending through said lower wall in aligned relation with said fluid communication aperture of said base segment, and
an ejection port formed through one of said opposed sidewalls distal the center of rotation of the rotor blade.

2. The blade-mounted total pressure probe of claim 1 wherein said planar configuration is complementary to the lower aerodynamic surface of the rotor blade.

3. The blade-mounted total pressure probe of claim 1 wherein said base segment has a predetermined offset.

4. The blade-mounted total pressure probe of claim 3 wherein said predetermined offset has a value equal to about six percent of a local chord of the rotor blade where said blade-mounted total pressure probe can be detachably mounted.

5. The blade-mounted total pressure probe of claim 4 wherein said predetermined offset is 0.254 centimeters (0.10 inches).

6. The blade-mounted total pressure probe of claim 1 further comprising mounting bores extending through said interface surface and said aerodynamically-streamlined body member of said base segment; and chamfered mounting bores extending through said back wall of said inlet segment;

said mounting bores of said base segment being contiguous and aligned with said chamfered mounting bores of said inlet segment.

7. A blade-mounted total pressure probe for a helicopter main rotor assembly including a shipset of main rotor blades, and wherein one of said main rotor blades of said shipset has a processing means internally mounted therein for generating a signal representative of the total pressure detected by said blade-mounted total pressure probe, comprising:

a base segment including
an interface surface having a planar configuration that is complementary to an aerodynamic surface of said one main rotor blade having said processing means internally mounted therein for detachably mounting said blade-mounted total pressure probe in superposed combination with said internally-mounted processing means of said one main rotor blade,
an aerodynamically-streamlined body member contiguous with said interface surface and including a leading edge and first and second flow surfaces, and
a fluid communication aperture extending through said aerodynamically-streamlined body member and said interface surface to an inlet port of said internally-mounted processing means; and an inlet segment including
a lower wall contiguous with said aerodynamically-streamlined body member, opposed sidewalls contiguous with said lower wall, and an upper wall contiguous with said opposed sidewalls, and wherein said lower wall, said opposed sidewalls, and said upper wall in combination define an inlet, a backwall contiguous with said lower wall, said upper wall, and said opposed sidewalls, and wherein said backwall, said lower wall, said opposed sidewalls, and said upper wall in combination define a collection chamber, a fluid communication aperture extending through said lower wall in aligned relation with said fluid communication aperture of said base segment, and an ejection port formed through one of said opposed sidewalls distal the center of rotation of the rotor blade.

8. The blade-mounted total pressure probe of claim 7 wherein said planar configuration is complementary to the lower aerodynamic surface of said one main rotor blade.

9. The blade-mounted total pressure probe of claim 7 wherein said base segment has a predetermined offset.

10. The blade-mounted total pressure probe of claim 9 wherein said predetermined offset has a value equal to about six percent of a local chord of said one rotor blade where said blade-mounted total pressure probe is detachably mounted.

11. The blade-mounted total pressure probe of claim 10 wherein said predetermined offset is 0.254 centimeters (0.10 inches).

12. The blade-mounted total pressure probe of claim 7 further comprising mounting bores extending through said interface surface and said aerodynamically-streamlined body member of said base segment; and chamfered mounting bores extending through said back wall of said inlet segment;

said mounting bores of said base segment being contiguous and aligned with said chamfered mounting bores of said inlet segment for detachably mounting said blade-mounted total pressure probe in combination with said one main rotor blade.

* * * * *